UNITED STATES PATENT OFFICE.

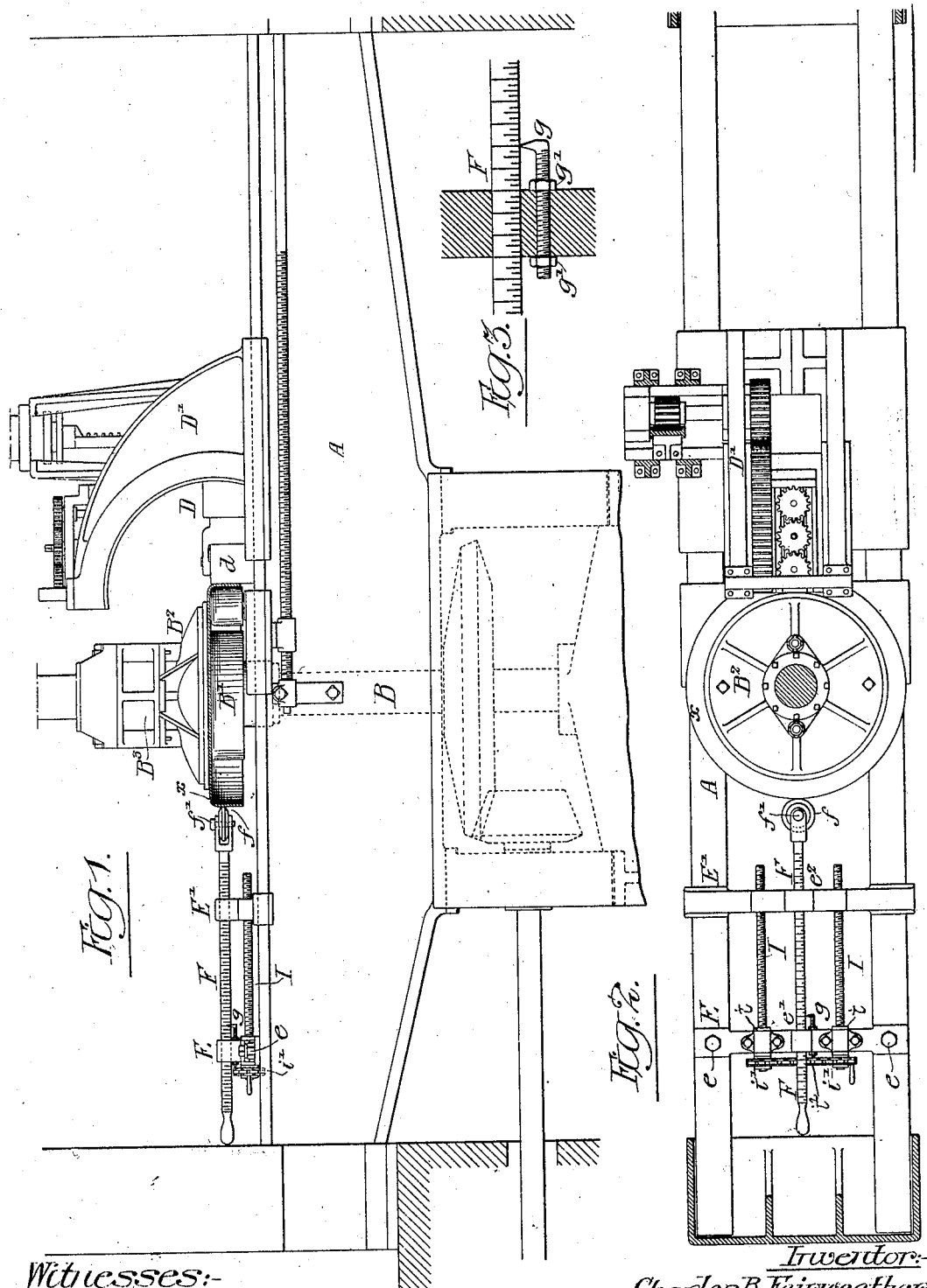

CHARLES B. FAIRWEATHER, OF COATESVILLE, PENNSYLVANIA, ASSIGNOR TO J. S. WORTH AND W. P. WORTH, OF COATESVILLE, PENNSYLVANIA.

GAGE FOR FLANGING-MACHINES.

No. 800,091.      Specification of Letters Patent.      Patented Sept. 19, 1905.

Application filed December 5, 1901. Serial No. 84,769.

*To all whom it may concern:*

Be it known that I, CHARLES B. FAIRWEATHER, a citizen of the United States, and a resident of Coatesville, Pennsylvania, have invented certain Improvements in Gages for Flanging-Machines, of which the following is a specification.

My invention relates to certain improvements in machines for flanging metallic plates to form heads and covers for boilers, tanks, &c.

Heretofore in the use of a flanging-machine it has been a difficult matter to gage the flanged cover-plate so that it would be exactly the diameter desired, and the common practice has been to use a caliper-gage for this purpose; but as a metallic plate is hot while being flanged and the plate is oftentimes several feet in diameter it will be seen that a caliper is a very unsatisfactory instrument to use in gaging plates on machines of this type.

The object of my invention is to dispense with the ordinary caliper-gage and use a gage that can be readily adjusted and fixed to the machine and which will be accurate in its measurements and can be used while the machine is in motion.

In the accompanying drawings, Figure 1 is a side view of sufficient of a flanging-machine to illustrate my invention. Fig. 2 is a plan view of Fig. 1, and Fig. 3 is an enlarged view of a detail of the invention.

A is the base-frame of the flanging-machine, which may be of any of the ordinary types. B is the vertical shaft carrying the flanging-head B', over which the plate $x$ to be flanged is turned. This shaft B can be driven from a power-shaft in any suitable manner. The plate $x$ is secured to the flanging-head B' by a clamp $B^2$ on the end of the plunger $B^3$. $d$ is the flanging-roll, carried by a segment D, arranged to travel in a guide D' on a carriage mounted on the frame A and adjustable toward and from the flanging-head B'. All this mechanism is fully illustrated, described, and claimed in the patent granted to John S. Worth on March 20, 1900, No. 645,843, and therefore need not be described further in this application.

On the frame A opposite to the flanging-segment D, I mount a cross-beam E, which is fixed to the frame in the present instance by bolts $e$. On the cross-frame E is a bearing $e'$ for the gage-bar F, which is preferably graduated either in inches or in any scale desired, and at one end of this bar is a bearing-wheel $f$, pivoted at $f'$ to the bar and arranged to rest against the flanged portion of the plate. On the cross-beam E is a pointer or indicator $g$, which is secured in position in respect to the indicator-bar F, so that when the roller $f$ is resting against the flange of the plate it will indicate the diameter of the plate. This indicator or pointer is preferably made adjustable, as shown in Fig. 3, having a screw-threaded shank on which are two nuts $g'$.

In order to steady the outer portion of the indicator-bar F, I provide a bearing E', which rests on the upper surface of the frame A and carries a bearing $e^2$, through which the indicator-bar freely passes, and in order to adjust this bearing E' in respect to the cross-beam E, I mount two screw-shafts I I in bearings $i$ on the beam E, and these screw-shafts I extend through screw-threaded openings in the bearing E', and on the outer ends of the screw-shafts I I are sprocket-wheels $i'$, which are geared together by a drive-chain $i^2$, and on one of these sprocket-wheels is a handle by which the wheels and their screw-shafts are turned, so that when the screw-shafts are turned in one direction the bearing is moved out toward the flanging-head of the machine and when turned in the opposite direction is drawn away from the flanging-head toward the beam E. By this arrangement I can steady the gage-bar at a point near the flanging-head, so as to make it accurate in its measurements, and when a large head is being flanged I can back off the bearing to the proper distance and still rigidly support the gage-bar.

While I have shown the gage-bar mounted in the particular position indicated in the drawings, in some machines this portion of the frame may carry some other parts of the machine, and in this event the gage-bar can be mounted on a bracket or other suitable support projecting from one side of the machine, if desired; but where practicable I prefer to mount the gage-bar directly on the frame of the machine.

I claim as my invention—

1. The combination in a flanging-machine, of a frame, a rotatable head thereon, mechanism on one side of said head for turning a flange on a plate carried by said head, a bearing on the frame opposite the flanging mechanism, a gage-bar mounted in the bearing and arranged to be moved toward and from the center of the rotatable head, so that the gage-bar can be moved out of action while the flange is being turned and can be moved into operative position when the flange is being finished, substantially as described.

2. The combination in a flanging-machine, of the flanging-head, means for flanging a plate on the head, means for rotating said head, a cross-beam mounted on the frame, a bearing also mounted on the frame, and a gage-bar carried by the cross-beam and the bearing, with means for moving the bearing toward and from the cross-beam, substantially as described.

3. The combination in a flanging-machine, of a rotatable flanging-head, means for flanging a plate on said head, a cross-beam and a bearing mounted on the frame of the machine, a gage-bar mounted on the beam and the bearing, screw-shafts carried by the beam and extending through screw-threaded openings in the bearing, said screw-shafts being geared together so that they will turn in unison, substantially as described.

4. The combination of a flanging-machine, a frame, a rotatable flanging-head, means for flanging a plate on the head, a cross-beam, a gage-bar mounted on the cross-beam and graduated, with an adjustable indicator on the cross-beam and arranged in position in respect to the gage-bar, substantially as described.

5. The combination of a flanging-machine, a frame, a rotatable flanging-head, means for flanging a plate on the head, a cross-beam, a gage-bar mounted on the cross-beam and graduated, an indicator mounted in the cross-beam and having a pointer, the shank of said indicator being screw-threaded, and nuts on the shank on each side of the beam, substantially as described.

In testimony whereof I have signed my name to this specification in the presence of two subscribing witnesses.

CHARLES B. FAIRWEATHER.

Witnesses:
WILL. A. BARR,
JOS. H. KLEIN.